United States Patent
Park et al.

(10) Patent No.: US 11,128,974 B2
(45) Date of Patent: Sep. 21, 2021

(54) ELECTRONIC DEVICE, EXTERNAL ELECTRONIC DEVICE, AND AUDIO SYSTEM COMPRISING SAME

(71) Applicant: SAMSUNG ELECTRONICS CO., LTD., Suwon-si (KR)

(72) Inventors: Jong-jin Park, Suwon-si (KR); Won-jae Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/762,607

(22) PCT Filed: Aug. 17, 2018

(86) PCT No.: PCT/KR2018/009442
§ 371 (c)(1),
(2) Date: May 8, 2020

(87) PCT Pub. No.: WO2019/098499
PCT Pub. Date: May 23, 2019

(65) Prior Publication Data
US 2020/0351605 A1    Nov. 5, 2020

(30) Foreign Application Priority Data
Nov. 16, 2017 (KR) .......................... 10-2017-0153190

(51) Int. Cl.
*H04S 7/00* (2006.01)
*H04R 29/00* (2006.01)
*H04R 3/00* (2006.01)

(52) U.S. Cl.
CPC ........... *H04S 7/301* (2013.01); *H04R 29/001* (2013.01); *H04S 7/307* (2013.01); *H04R 3/00* (2013.01)

(58) Field of Classification Search
CPC ....... H04S 7/301; H04S 7/307; H04R 29/001; H04R 3/00
See application file for complete search history.

(56) References Cited

U.S. PATENT DOCUMENTS 9,154,848 B2    10/2015 Ouchi et al.
2008/0232810 A1    9/2008 Lu et al.
(Continued)

FOREIGN PATENT DOCUMENTS

JP    2005-176091    6/2005
JP    5695447    4/2015
(Continued)

OTHER PUBLICATIONS

Nam et al., Translation of KR10-2017-0047634, "System and method for transceiving data using non-audible frequency band", May 8, 2017.*
(Continued)

*Primary Examiner* — Regina N Holder
(74) *Attorney, Agent, or Firm* — Nixon Vanderhye, P C.

(57) ABSTRACT

An electronic device and an audio system comprising the electronic device are disclosed. The electronic device comprises: a microphone; a communicator performing communication with an external electronic device, and a processor configured to, based on receiving, via the microphone, an audio signal generated in a surroundings of the microphone and an audio signal of an inaudible frequency band which the external electronic device outputs through a speaker connected to the external electronic device, remove audio signals of remaining frequency bands except for the inaudible frequency band from the received audio signals and control the communicator to transmit an audio signal of the inaudible frequency band to the external electronic device.

13 Claims, 6 Drawing Sheets

(56) References Cited

U.S. PATENT DOCUMENTS

2014/0233755 A1    8/2014   Kim et al.
2016/0100379 A1    4/2016   Nguyen et al.
2016/0309279 A1   10/2016   Kim et al.

FOREIGN PATENT DOCUMENTS

| KR | 10-2000-0028498 | 5/2000 |
| KR | 10-2014-0104215 | 8/2014 |
| KR | 10-2016-0061176 | 5/2016 |
| KR | 10-2016-0128118 | 11/2016 |
| KR | 10-2017-0047634 | 5/2017 |

OTHER PUBLICATIONS

International Search Report for PCT/KR2018/009442 dated Nov. 28, 2018, 4 pages.
Written Opinion of the ISA for PCT/KR2018/009442 dated Nov. 28, 2018, 10 pages.

\* cited by examiner

100

200

ELECTRONIC DEVICE, EXTERNAL ELECTRONIC DEVICE, AND AUDIO SYSTEM COMPRISING SAME

This application is the U.S. national phase of International Application No. PCT/KR2018/009442 filed 17 Aug. 2018, which designated the U.S. and claims priority to KR Patent Application No. 10-2017-0153190 filed 16 Nov. 2017, the entire contents of each of which are hereby incorporated by reference.

TECHNICAL FIELD

The disclosure relates to an electronic device, an external electronic device and an audio system comprising the same, and more specifically to an electronic device capable of transmitting and receiving audio signals, an external electronic device and an audio system comprising the same.

BACKGROUND ART

Recently, with the development of electronic technology, various electronic devices such as televisions (TV), computers, and notebooks are being developed, and these electronic devices provide various content through various methods to satisfy the detailed demands of consumers.

For example, display devices, such as TVs, may not only output audio through its own speakers but also output audio through external speakers connected by methods such as Bluetooth. Accordingly, users may now receive high quality audio through external speakers with high specifications.

In certain cases, it may be necessary to check whether audio is being normally output from external speakers. For example, cases such as checking to see if the external speaker is properly connected to the display device, such as a TV, or when problem in audio quality output from the external speaker has occurred, may be some of the cases.

SUMMARY

The disclosure provides an electronic device capable of identifying if a speaker connected to an external electronic device, such as a TV, is normally outputting an audio signal, an external electronic device, and an audio system comprising the same.

According to an embodiment, an electronic device includes a microphone, a communicator performing communication with an external electronic device, and a processor configured to, based on receiving, via the microphone, an audio signal generated in a surroundings of the microphone and an audio signal of an inaudible frequency band which the external electronic device outputs through a speaker connected to the external electronic device, remove audio signals of remaining frequency bands except for the inaudible frequency band from the received audio signals and control the communicator to transmit an audio signal of the inaudible frequency band to the external electronic device.

The processor may be configured to, through a band pass filter, remove audio signals of remaining frequency bands except for the inaudible frequency band from the received audio signals, and encode an audio signal of the inaudible frequency band to transmit to the external electronic device.

A data size of an audio signal of the inaudible frequency band may be smaller than a size corresponding to a channel bandwidth between the electronic device and the external electronic device.

An audio signal generated in the surroundings of the microphone may include at least one of an audio signal of an audible frequency band which the external electronic device outputs through the speaker and an audio signal uttered by a user in the surroundings of the microphone.

The processor may be configured to activate the microphone to receive the audio signal based on receiving an audio transmission request signal from the external electronic device, and inactivate the microphone based on receiving a stop transmission request signal from the external electronic device after a signal of the inaudible frequency band is transmitted to the external electronic device.

According to an embodiment, an electronic device includes a communicator configured to perform communication with at least one of a speaker and an external electronic device, and a processor controlling the communicator configured to transmit an audio signal of an inaudible frequency band to the speaker, and receive an audio signal of an inaudible frequency band output through the speaker from the external electronic device, and the received audio signal is a signal ranging from a signal including an audio signal generated from the surroundings of the external electronic device and an audio signal of an inaudible frequency band output through the speaker, to an audio signal with the audio signals of remaining frequency bands removed except for the inaudible frequency band.

An audio signal of the received inaudible frequency band, through a band pass filter, may be an audio signal with audio signals of remaining frequency bands removed except for the inaudible frequency band from signals including an audio signal generated in the surroundings of the external electronic device and an audio signal of the inaudible frequency band output through the speaker, and the processor is configured to identify whether an audio signal of an inaudible frequency band transmitted to the speaker and an audio signal of the received inaudible frequency band match a predetermined threshold value or more.

A data size of an audio signal of the received inaudible frequency band may be smaller than a size corresponding to a channel bandwidth between the electronic device and the external electronic device.

An audio signal generated in the surroundings of the external electronic device may include at least one of an audio signal of an audible frequency band which the electronic device outputs through the speaker and an audio signal uttered by a user in the surroundings of the external electronic device.

The processor may be configured to transmit an audio signal of an inaudible frequency band to the speaker, transmit an audio transmission request signal to the external electronic device, stop a transmission of an audio signal of the inaudible frequency band based on receiving an audio signal of the inaudible frequency band output through the speaker from the external electronic device, and transmit a stop transmission request signal to the external electronic device.

According to an embodiment, an audio system includes an electronic device configured to transmit an audio signal of an inaudible frequency band to a connected speaker, and an external electronic device configured to, based on receiving, via a microphone, an audio signal generated in the surroundings of a microphone and an audio signal of the inaudible frequency band output through the speaker, remove audio signals of remaining frequency bands except for the inaudible frequency band from the received audio signals and transmit an audio signal of the inaudible frequency band to the electronic device.

The external electronic device may be configured to, through a band pass filter, remove audio signals of remaining frequency bands except for the inaudible frequency band from the received audio signals, and encode an audio signal of the inaudible frequency band to transmit to the electronic device.

The electronic device may be configured to, based on receiving an audio signal of the inaudible frequency band, decode an audio signal of the inaudible frequency band, and identify whether an audio signal of the inaudible frequency band transmitted to the speaker and the decoded audio signal match a predetermined threshold value or more A data size of an audio signal of the inaudible frequency band may be smaller than a size corresponding to a channel bandwidth between the electronic device and the external electronic device.

An audio signal generated in the surroundings of the microphone may include at least one of an audio signal of an audible frequency band which the electronic device outputs through the speaker and an audio signal uttered by a user in the surroundings of the microphone.

The electronic device may be configured to transmit an audio signal of an inaudible frequency band to the speaker, transmit an audio transmission request signal to the external electronic device, stop a transmission of an audio signal of the inaudible frequency band based on receiving an audio signal of the inaudible frequency band output through the speaker from the external electronic device, and transmit a stop transmission request signal to the external electronic device.

The external electronic device may be configured to activate the microphone to receive the audio signal based on receiving an audio transmission request signal from the external electronic device, and inactivate the microphone based on receiving a stop transmission request signal from the external electronic device after a signal of the inaudible frequency band is transmitted to the external electronic device.

Accordingly, the electronic device 100 may, by inactivating the microphone 110 when the stop transmission request signal is received from the external electronic device 200, minimize power consumption.

According to the various embodiments as described above, a speaker normally outputting an audio signal may be identified through an audio signal of an inaudible frequency band with removed audio signal of an audible frequency band.

Accordingly, not only may we protect privacy of users be protected, but also issues of limiting bandwidths of external electronic devices may be prevented from occurring.

DETAILED DESCRIPTION OF EXAMPLE EMBODIMENTS

Figure 1:
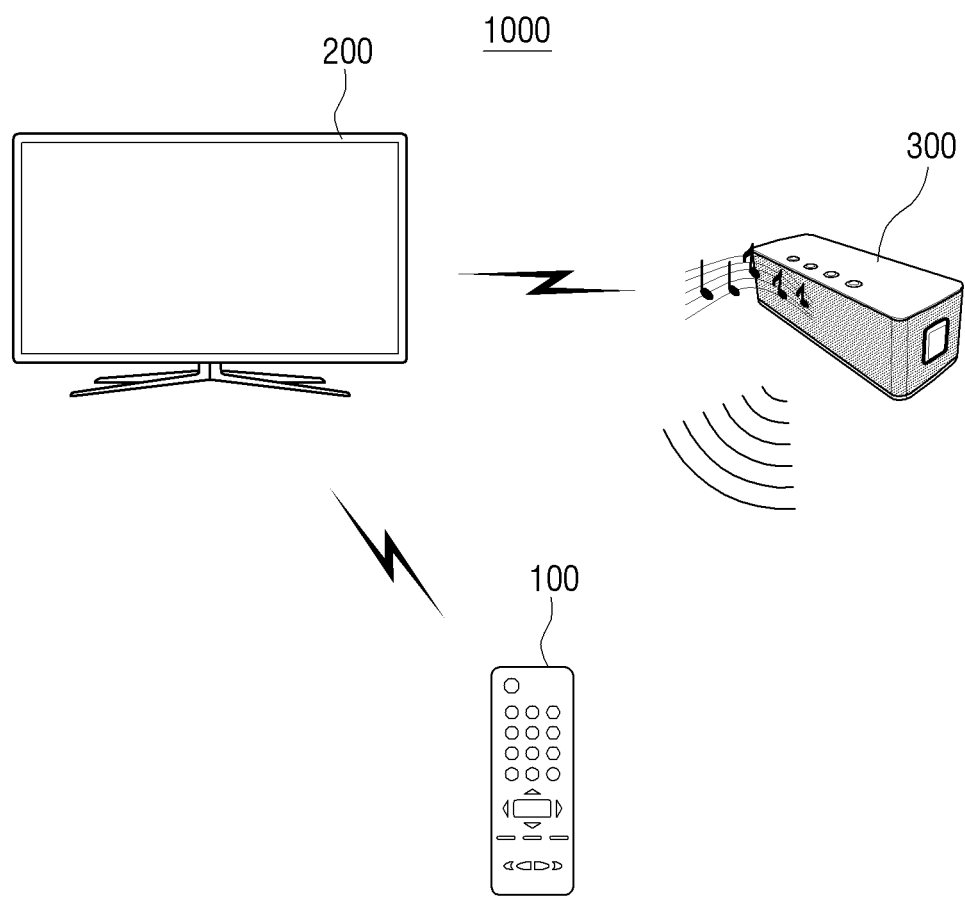
FIG. 1 is a diagram illustrating an audio system according to an embodiment of the disclosure.

Terms used in the specification and the claims may be general terms selected in consideration of the functions of the disclosure. However, the terms may vary depending on intention, legal or technical interpretation, emergence of new technologies, and the like of those skilled in the related art. In addition, there may be some terms arbitrarily identified by an applicant. These terms may be construed based on the meaning as defined in the specification, and if there is no specific definition of a term, the term may be construed based on the overall contents and technological common sense of those skilled in the related art.

In addition, in describing embodiments, if it is determined that detailed description of related known technologies or configurations may unnecessarily confuse the gist of the disclosure, the detailed description will be omitted.

Further, although the embodiments of the disclosure have been described in detail with reference to the attached drawings below and the descriptions disclosed in the drawings, the disclosure may not be limited by or limited to the embodiments described herein.

The disclosure will be described in detail below with reference to the attached drawings.

FIG. 1 is a diagram illustrating an audio system according to an embodiment of the disclosure.

Referring to FIG. 1, the audio system 1000 according to an embodiment may include an electronic device 100, an external electronic device 200, and a speaker 300.

The external electronic device 200 may be connected to the speaker 300.

Specifically, the external electronic device 200 may be connected to the speaker 300 using a Bluetooth network. However, this is merely one example, and the external electronic device 200 may be connected to the speaker 300 using various networks such as, for example, a Wi-Fi network, a ZigBee network, a near field communication (NFC) network, and the like.

To this end, the external electronic device 200 may include a Bluetooth chip, a Wi-Fi chip, and the like.

The external electronic device 200 may be connected to the speaker 300 through a wired cable. For example, the external electronic device 200 may, not only connect with the speaker 300 through a copper cable, but may also connect with the speaker 300 through an optical cable.

The external electronic device 200 may output various audio signals through the speaker 300.

The audio signals output through the speaker 300 may be an audio signal of an audible frequency band. To this end, the external electronic device 200 may transmit the audio signal of the audible frequency band to the speaker 300.

For example, if the external electronic device 200 provides a broadcast image, an audio signal corresponding to the broadcast image may be output through the speaker 300. However, this is merely one embodiment, and if the external electronic device 200 provides a multi-media content image, an audio signal corresponding to the multi-media content image may be output through the speaker 300, and if an application image is provided, an audio signal corresponding to the application image may be output through the speaker 300. In addition, if a music file such as an mp3 is played, the external electronic device 200 may output an audio signal corresponding to the music file through the speaker 300.

The external electronic device 200 may output an audio signal of an inaudible frequency band through the speaker 300. To this end, the external electronic device 200 may transmit the audio signal of the inaudible frequency band to the speaker 300.

The audio signal of the inaudible frequency band may be a signal for checking whether sound of the speaker 300 is output.

Specifically, the external electronic device 200 may receive an audio signal output through the speaker 300 from the electronic device 100. The external electronic device 200 may then compare the audio signal of the inaudible frequency band transmit to the speaker 300 and the audio signal received from the electronic device 100, and if both signals match a predetermined threshold value or more, may identify that the speaker 300 is normally outputting an audio signal.

Accordingly, the audio system 1000 according to an embodiment may, by using the audio signal of the inaudible frequency band to check whether sound of the speaker 300 is output, have an effect of being able to identify whether the speaker 300 is normally outputting sound while the user continuously listens to music and the like being output from the audible frequency band.

The external electronic device 200 performing the functions described above may be implemented as a TV as illustrated in FIG. 1. However, this is merely one embodiment, and the external electronic device 200 may be implemented to various electronic devices such as a desktop personal computer (PC), a notebook, a smartphone, and a personal digital assistance (PDA), capable of outputting audio signals through the speaker 300.

The electronic device 100 may be connected to the external electronic device 200.

Specifically, the electronic device 100 may be connected to the external electronic device 200 using a Bluetooth network. However, this is merely one embodiment, and the electronic device 100 may be connected to the external electronic device 200 using various networks such as a Wi-Fi network, a ZigBee network, a near field communication (NFC) network, a wireless communication network, and the like.

To this end, the electronic device 100 may include a Bluetooth chip, a Wi-Fi chip, a wireless communication chip, and the like.

The electronic device 100 may transmit and receive various signals by performing communication with the external electronic device 200.

Specifically, the electronic device 100 may receive an audio signal output through the speaker 300 via the microphone, and may transmit the received audio signal to the external electronic device 200. The audio signal received through the microphone may be an audio signal of an inaudible frequency band output through the speaker 300.

Further, as described above, the external electronic device 200 may, by comparing the audio signal of the inaudible frequency band transmitted to the speaker 300 and the audio signal received from the electronic device 100, identify whether the speaker 300 is normally outputting the audio signal.

The electronic device 100 performing the above-described function may be implemented as a remote control device as illustrated in FIG. 1. However, this is merely one embodiment, and the electronic device 100 may be implemented as various electronic devices, such as a smartphone and PDA, capable of transmitting and receiving audio signals.

However, if the electronic device 100 transmits the audio signal received through the microphone as is to the external electronic device 200, a few problems may occur.

First, a problem of privacy of the user being invaded may occur.

For example, in the process of the electronic device 100 receiving, via the microphone, the audio signal of the inaudible frequency band output through the speaker 300, if the user utters a voice, the microphone of the electronic device 100 may receive the audio signal output through the speaker 300 and an audio signal including the user's voice.

In this case, if the audio signal including the voice of the user is transmitted to the external electronic device 200, the privacy of the user may be invaded. If the external electronic device 200 is implemented as an electronic device such as a smart TV capable of internet communication, the audio signal including the user's voice may be leaked externally by hacking.

Further, a problem of limiting the bandwidth of the external electronic device 200 may occur.

In general, when transmitting and receiving an audio signal of an audible frequency band, data having a sampling rate of 16 KHz may be used. However, when transmitting and receiving an audio signal of an audible frequency band, data having a sampling rate of 48 KHz may be used. That is, data of approximately 3 folds larger is size may be used.

Accordingly, if the audio signal received through the microphone is transmitted to the external electronic device 200 as is, the amount of data transmitted and received may be rapidly increased, and accordingly limiting of the bandwidth of the external electronic device 200 may occur.

In order to solve the problems described above, the electronic device 100 may remove the audio signals of the remaining frequency bands except for the inaudible frequency band from the audio signals received through the microphone, and may transmit the audio signal of the inaudible frequency band to the external electronic device 200.

Accordingly, the disclosure may protect the privacy of the user while simultaneously preventing the problem of limiting bandwidth of the external electronic device 200 from occurring. A more detailed description thereof will be described with reference to FIG. 2.

Figure 2:
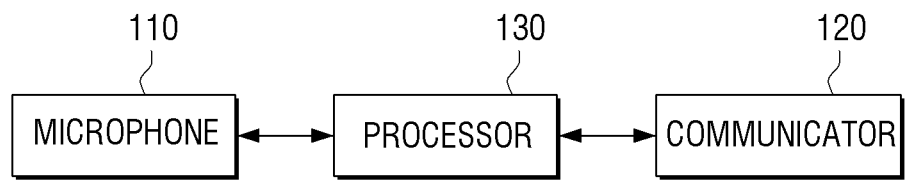
FIG. 2 is a block diagram illustrating an electronic device according to an embodiment of the disclosure.

FIG. 2 is a block diagram illustrating an electronic device according to an embodiment of the disclosure.

Referring to FIG. 2, the electronic device 100 according to an embodiment may include a microphone 110, a communicator 120 (e.g., communicator comprising circuitry), and a processor 130.

The microphone 110 may receive various audio signals. The audio signal may be an analog signal generated in the surroundings of the microphone.

Specifically, the microphone 110 may receive not only the audio signal of the audible frequency band generated in the surroundings of the microphone 110, but also the audio signal of the inaudible frequency band generated in the surroundings of the microphone 110.

The audio signal of the audible frequency band may be the audio signal corresponding to the broadcast image output through the speaker 300 connected to the external electronic device 200 if the external electronic device 200 is in the process of providing the broadcast image.

However, this is merely one embodiment, and if the external electronic device 200 is in the process of providing media content image, the audio signal of the audible frequency band may be the audio signal corresponding the multi-media content image output through the speaker 300 connected to the external electronic device 200, and if the external electronic device 200 is in the process of providing an application image, the audio signal of the audible frequency band may be an audio signal corresponding to the application image output through the speaker 300 connected to the external electronic device 200. Further, if the external electronic device 200 is in the process of playing a music file such as an mp3, the audio signal of the audible frequency band may be the audio signal corresponding to the music file. Further, the audio signal of the audible frequency band may be a voice uttered by the user in the surroundings of the microphone 110.

In addition, the audio signal of the inaudible frequency band may be the audio signal output through the speaker in order for the external electronic device 200 to check whether the sound of the speaker 300 is being outputted.

The communicator 120 (e.g., communicator comprising circuitry) may perform communication with the external electronic device 200 according to the communication method of various types, and transmit and receive various signals.

Specifically, the communicator 120 may perform communication with the external electronic device 200, and may transmit the audio signal received through the microphone 110 to the external electronic device 200. The audio signal received through the microphone 110 may be the audio signal of the audible frequency band as well as the audio signal of the inaudible frequency band, as described above.

The processor 130 may control the overall operation of the electronic device 100. To this end, the processor 130 may include one or more of a central processing unit (CPU), an application processor (AP), or a communication processor (CP).

First, the processor 130 may receive an audio signal through the microphone 110.

Specifically, the processor 130 may receive an audio signal generated in the surroundings of the microphone 110 and an audio signal of an inaudible frequency band which the external electronic device 200 output through the speaker 300 connected to the external electronic device 200.

The audio signal generated in the surroundings of the microphone 110 may include at least one of an audio signal of an audible frequency band which the external electronic device 200 outputs through the speaker 300 and an audio signal uttered by the user in the surroundings of the microphone 110.

As described above, the audio signal of the audible frequency band which the external electronic device 200 outputs through the speaker 300 may be an audio signal corresponding to a broadcast image if the external electronic device 200 is in the process of providing the broadcast image. In addition, if the external electronic device 200 is in the process of providing a media content image, the audio signal of the audible frequency band may be an audio signal corresponding to the multi-media content image, and if the external electronic device 200 is in the process of providing an application image, the audio signal of the audible frequency band may be an audio signal corresponding to the application image. In addition, if the external electronic device 200 is in the process of playing a music file, such as an mp3, the audio signal of the audible frequency band may be an audio signal corresponding to the music file. In addition, the audio signal generated in the surroundings of the microphone 110 may further include daily noise, static noise, and the like.

Further, the audio signal of the inaudible frequency band output through the speaker 300 connected to the external electronic device 200 may be a signal for checking if the speaker 300 is normally outputting an audio signal.

The processor 130 may, based on receiving an audio transmission request signal from the external electronic device 200, activate the microphone 110, and may receive an audio signal through the microphone 110. The audio transmission request signal, as a signal which the external electronic device 200 transmits to the electronic device 100, may be a signal requesting the transmission of the audio signal received through the microphone 110.

Accordingly, the processor 130 may activate the microphone 110 when the audio transmission request signal is received from the external electronic device 200, and in other cases, minimize power consumption in terms of keeping the microphone inactivated.

The processor 130 may then process the audio signal received through the microphone 110.

Specifically, the processor 130 may convert the audio signal received through the microphone 110 to a digital signal. To this end, the processor 130 may use various technologies such as a pulse density modulation (PDM)-to-pulse code modulation (PCM) converter.

The processor 130 may then remove the audio signals of the remaining frequency bands except for the inaudible frequency band from the audio signals received through the microphone 110.

To this end, the processor 130 may use a band pass filter. Specifically, the processor 130 may remove the signals of the remaining ranges except for the range from approximately 17 KHz to 20 KHz, which is the inaudible frequency band from the audio signals received from the microphone through the band pass filter, and filter only the audio signal of the inaudible frequency band.

Accordingly, the processor 130 may obtain the audio signal of the inaudible frequency band with the audible frequency band removed.

The data size of the audio signal of the inaudible frequency band which was signal processed as above may be smaller than the size corresponding to the channel bandwidth between the electronic device 100 and the external electronic device 200.

Specifically, the data size of the audio signal of the inaudible frequency band prior to signal processing may, as described above, use data that is larger by approximately 3 folds when compared to the data size of the audio signal of the audible frequency band.

On the other hand, the audio signal of the inaudible frequency band that processed using the band pass filter, as an audio signal with the audio signal of the audible frequency band of a range from approximately 0.2 KHz to 8 KHz removed, may be an audio signal of a data size smaller than the size corresponding to the channel bandwidth between the electronic device 100 and the external electronic device 200.

Accordingly, the disclosure may have the effect of preventing the problem of limiting the bandwidth of the external electronic device 300 from occurring.

The processor 130 may encode the audio signal of the inaudible frequency band with the audible frequency band removed, and transmit the encoded audio signal to the external electronic device 200. For the encoding various encoding technology such as an SBC Encoder may be used.

Accordingly, by transmitting the audio signal of the inaudible frequency band with the audible frequency band removed to the external electronic device 200, the disclosure may have the effect of preventing the problem of invading the privacy of the user due to the voice uttered by the user including a signal of approximately 10 KHz range.

The processor 130 may, when a stop transmission request signal is received from the external electronic device 200, inactivate the microphone 110. The stop transmission request signal, as a signal for the external electronic device 200 to transmit to the electronic device 100, may be a signal requesting a suspension of the audio signal transmission.

Accordingly, the processor 130 may, by inactivating the microphone 110 when the stop transmission request signal is received from the external electronic device 200, minimize power consumption.

Figure 3:
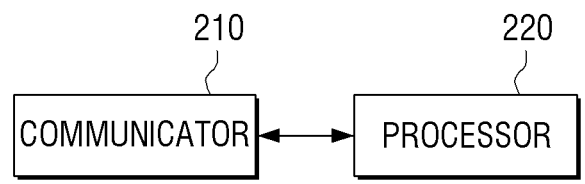
FIG. 3 is a block diagram illustrating an external electronic device according to an embodiment of the disclosure.

FIG. 3 is a block diagram illustrating an external electronic device according to an embodiment of the disclosure.

Referring to FIG. 3, the external electronic device 200 according to an embodiment may include a communicator 210 (e.g. communicator comprising circuitry) and a processor 220.

The communicator 210 may perform communication with the electronic devices of various types according to the communication method of various types.

The communicator 210 may perform communication with the speaker 300 to transmit and receive various signals.

Specifically, the communicator 210 may perform communication with the speaker 300 to transmit an audio signal. The audio signal transmitted to the speaker 300 may be, as described above, an audio signal of an audible frequency band as well as an audio signal of an inaudible frequency band.

In addition, the communicator may perform communication with the electronic device 100 to transmit and receive various signals.

Specifically, the communicator 210 may perform communication with the electronic device 100 to receive an audio signal. The audio signal received from the electronic device may, as described above, include an audio signal of the audible frequency band as well as an audio signal of an inaudible frequency band.

As described above, the audio signal of the audible frequency band may be an audio signal corresponding to a broadcast image being provided by the external electronic device 200, and the like. Further, the audio signal of the audible frequency band may be a voice uttered by the user.

Further, the audio signal of the inaudible frequency band may be a signal for checking whether the speaker 300 is normally outputting the audio signal.

The processor 220 may control the overall operation of the external electronic device 200. To this end, the processor 220 may include one or more of a central processing unit (CPU), an application processor (AP), or a communication processor (CP).

First, the processor 220 may transmit an audio signal of an inaudible frequency band to the speaker 300. The audio signal of the inaudible frequency band may be a signal for checking whether the speaker 300 is normally outputting the audio signal.

The processor 220 may then receive the audio signal of the inaudible frequency band output through the speaker from the electronic device 100.

The audio signal of the inaudible frequency band received from the electronic device 100 may be an audio signal that is signal processed by the electronic device 100.

Specifically, in the audio signal received through the microphone 100 of the electronic device, an audio signal generated in the surroundings of the electronic device 100 and an audio signal of the inaudible frequency band output through the speaker 300 may be included. The audio signal of the inaudible frequency band which the external electronic device 200 receives from the electronic device 100 may be an audio signal with the audio signals of the remaining frequency band removed except for the inaudible frequency band.

The signal processing may be performed through the band pass filter. Specifically, the electronic device 100 may, through the band pass filter, remove the signals of the remaining ranges except for the range from approximately 17 KHz to 20 KHz, which is the inaudible frequency band from the audio signals received through the microphone 110 and filter only the audio signal of the inaudible frequency band.

Accordingly, the processor 220 may receive the audio signal of the inaudible frequency band with the audible frequency band removed from the electronic device 100.

As described above, the data size of the audio signal of the signal processed inaudible frequency band may be smaller than the size corresponding to the channel bandwidth between the electronic device 100 and the external electronic device 200.

The processor 220 may then identify if the audio signal of the inaudible frequency band transmitted to the speaker 300 and the audio signal of the inaudible frequency band received from the electronic device 100 match a predetermined threshold value or more.

Based on the identification results, if it is identified that both audio signals match a predetermined threshold value or more, the processor 220 may identify the speaker 300 as normally outputting the audio signal.

Figure 4:
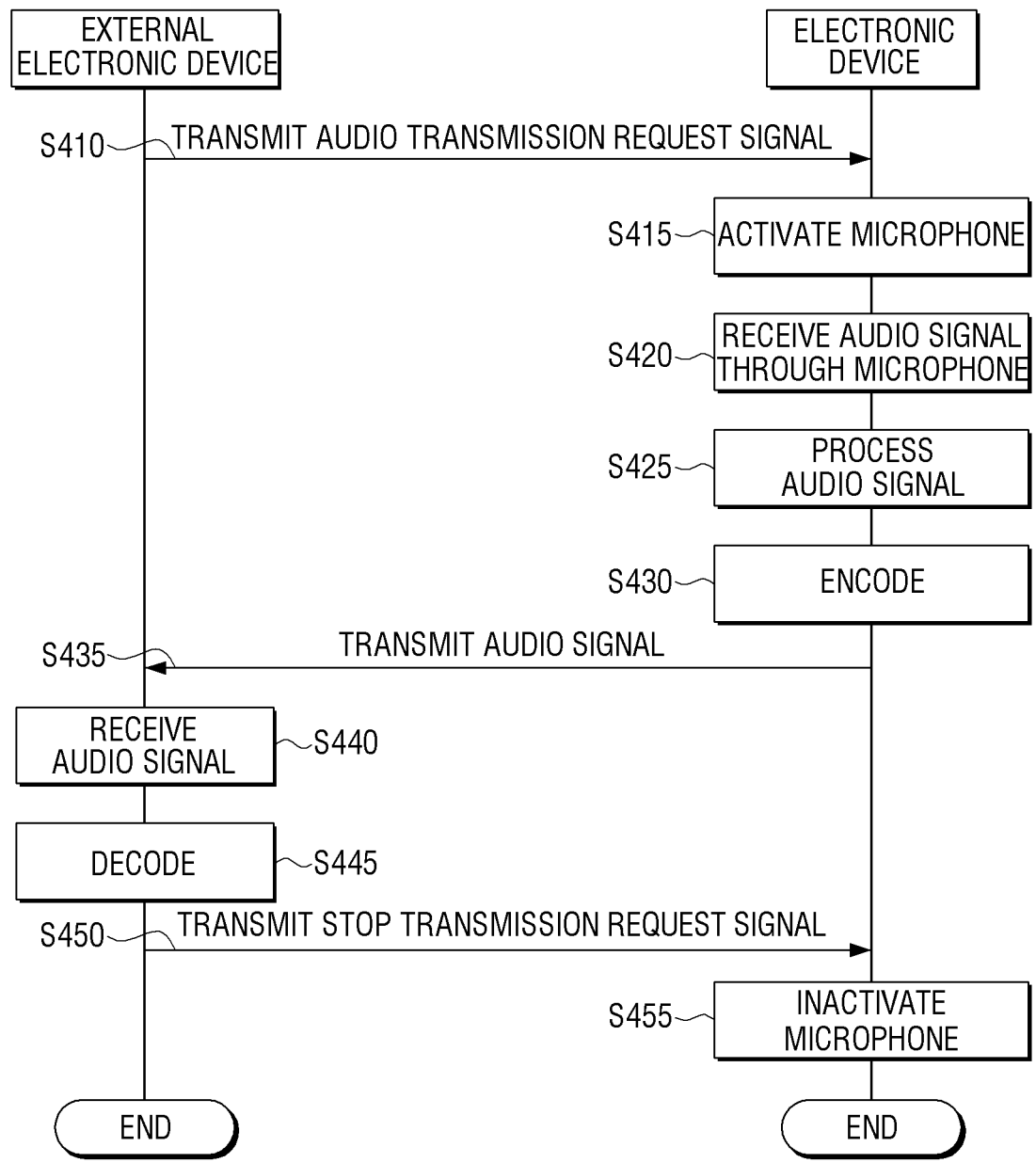
FIG. 4 is a flowchart illustrating an operation of an audio system according to an embodiment of the disclosure.

FIG. 4 is a flowchart illustrating an operation of an audio system according to an embodiment of the disclosure.

First, the external electronic device 200 may transmit an audio transmission request signal to the electronic device 100 (S410). The audio transmission request signal may be a signal requesting the transmission of an audio signal.

The external electronic device 200 may transmit the audio signal of the inaudible frequency band to the speaker 300. However, this is not limited thereto, and the external electronic device 200 may transmit the audio signal of the inaudible frequency band to the speaker 300 prior to transmitting the audio transmission request signal, or may transmit the audio signal of the inaudible frequency band to the speaker 300 after transmitting the audio transmission request signal.

The electronic device 100 may, based on receiving the audio transmission request signal, activate the microphone 110 (S415). Accordingly, the electronic device 100 may activate the microphone 100 based on receiving the audio transmission request signal from the external electronic device 200, and in other cases, minimize power consumption in terms of keeping the microphone 100 inactivated.

Further, the electronic device 100 may receive the audio signal through the activated microphone 110 (S420). The audio signal may not only include the audio signal of the audible frequency band, but also the audio signal of the inaudible frequency band.

Specifically, when the external electronic device 200 is outputting an audio signal corresponding to the broadcast image through the speaker 300 or when the use is uttering voice in the surroundings of the microphone 110, if the external electronic device 200 outputs the audio signal of the inaudible frequency band through the speaker 300, the microphone 110 may receive the audio signal of the audible frequency band together with the audio signal of the inaudible frequency band.

Further, the electronic device 100 may signal process the audio signal received through the microphone 110 (S425). Specifically, the electronic device 110 may remove the audio signals of the remaining frequency bands except for the audio signal of the inaudible frequency through the band pass filter.

The electronic device 100 may then encode the audio signal with the audio signals of the remaining frequency bands removed except for the inaudible frequency band (S430) to transmit to the external electronic device 200 (S435).

The external electronic device 200 may then receive the audio signal of the inaudible frequency band from the electronic device 100 (S440), and may decode the audio signal (S445). The decoding may be performed using various decoding technology such as a SBC Decoder.

The external electronic device 200 may then identify if the audio signal of the inaudible frequency band transmitted to the speaker 300 and the decoded audio signal matches a predetermined threshold value or more. Based on the identified results, if both audio signals are identified as matching the predetermined threshold value or more, the external electronic device 100 may identify the speaker 300 as normally outputting the audio signal.

The external electronic device 200 may then transmit a stop transmission request signal requesting the suspension of the audio signal transmission to the electronic device 100 (S450). Although, in the disclosure, the stop transmission request signal has been described as being transmitted to the electronic device 100 after identifying both audio signals as matching the predetermined threshold value or more, this is merely one embodiment, and the order of transmitting the stop transmission request signal may be varied. For example, the external electronic device 200 may, based on receiving the audio signal from the electronic device 100, immediately transmit the stop transmission request signal to the electronic device 100.

The electronic device 100 may then, based on receiving the stop transmission request signal from the external electronic device 200, inactivate the microphone 110 (S455).

Figure 5:
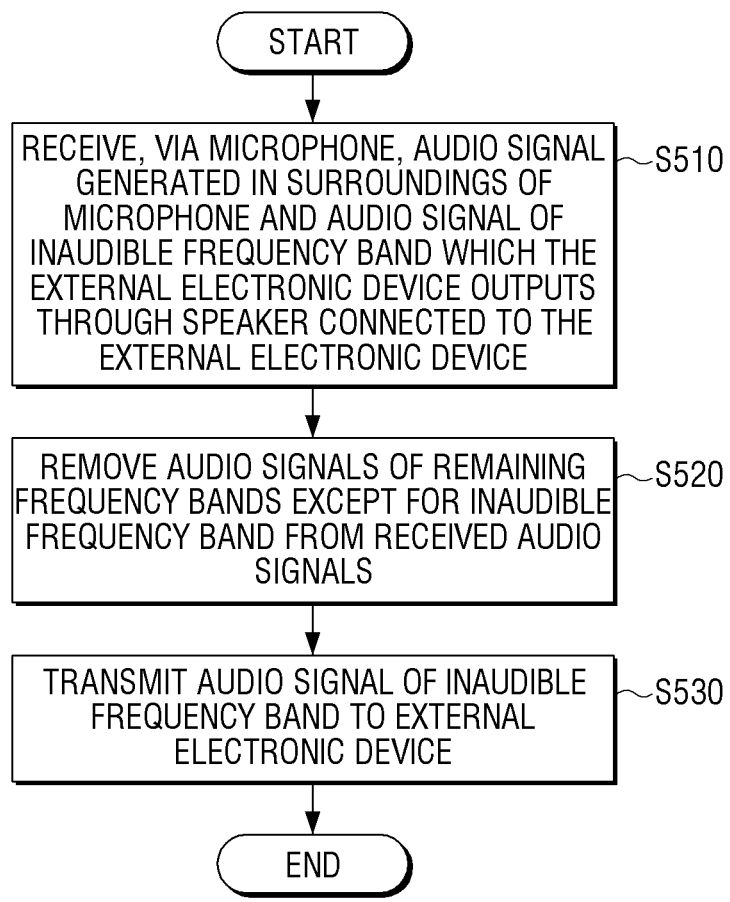
FIG. 5 is a flowchart illustrating an operation of an electronic device according to an embodiment of the disclosure.

FIG. 5 is a flowchart illustrating an operation of an electronic device according to an embodiment of the disclosure.

The electronic device 100 may receive, via the microphone, the audio signal generated in the surroundings of the microphone and the audio signal of the inaudible frequency band which the external electronic device outputs through the speaker connected to the external electronic device (S510).

The audio signal generated in the surroundings of the microphone 110 may include at least one of the audio signal of the audible frequency band that the electronic device 100 output through the speaker 300 and the audio signal uttered by the user in the surroundings of the microphone 110.

The electronic device 100 may then remove the audio signals of the remaining frequency bands except for the inaudible frequency band from the audio signals received from the microphone 110 (S520).

Specifically, the electronic device 100, through the band pass filter, remove signals of the remaining ranges except for the range from approximately 17 KHz to 20 KHz, which is the inaudible frequency band, from the audio signals received through the microphone 110.

The electronic device 100 may then transmit the audio of the inaudible frequency band to the external electronic device 200 (S530).

Accordingly, by removing the audio signal of the audible frequency band, the privacy of the user may be protected and the bandwidth of the external electronic device 200 being limited may be prevented from occurring.

Figure 6:
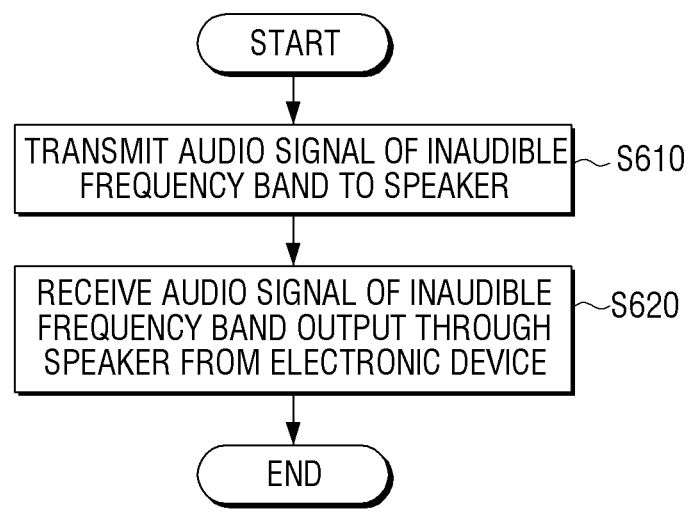
FIG. 6 is a flowchart illustrating an operation of an external electronic device according to an embodiment of the disclosure.

FIG. 6 is a flowchart illustrating an operation of an external electronic device according to an embodiment of the disclosure.

The external electronic device 200 may transmit the audio signal of the inaudible frequency band to the speaker 300 (S610). The audio signal of the inaudible frequency band may be a signal for checking whether the speaker 300 connected to the electronic device 200 is normally outputting the audio signal.

The external electronic device 200 may then receive the audio signal of the inaudible frequency band output through the speaker 300 from the electronic device 100 (S620).

The received audio signal may be the signal processed audio signal. Specifically, the received audio signal may be the audio signal with the audio signals of the remaining frequency bands removed except for the inaudible frequency band from the audio signals received through the microphone 110 of the electronic device 100.

The signal processing may be performed through the band pass filter. Specifically, the electronic device 100 may, through the band pass filter, remove signals of the remaining ranges except for the range from approximately 17 KHz to 20 KH, which is the inaudible frequency band from the audio signals received through the microphone 110, and filter only the audio signal of the inaudible frequency band.

Accordingly, the external electronic device 200 may receive the audio signal of the inaudible frequency band with the audible frequency band removed from the electronic device 100.

The external electronic device 200 may then compare the audio signal of the inaudible frequency band transmitted to the speaker 300 and the audio signal received from the electronic device 100 and, based on both signals matching the predetermined threshold value or more, identify that the speaker 300 is normally outputting the audio signal.

The methods according to various embodiments as described above may be implemented by a software upgrade or a hardware upgrade for conventional electronic devices.

In addition, the above-described various embodiments may be performed through an embedded server provided in the electronic device or through an external server.

The control method of the electronic device according to the various embodiments described above may be implemented as a program and stored in various recordable media. That is, computer programs processed by various processors and capable of executing the various control methods described above may be used in a stored state in a recordable medium.

In an example, a non-transitory computer readable medium stored with a program performing the step of receiving, via the microphone, an audio signal generated from the surroundings of the microphone of the electronic device and an audio signal of the inaudible frequency band which the external electronic device outputs through the speaker connected to the external electronic device and the step of removing audio signals of the remaining frequency bands excluding the inaudible frequency band from the received audio signals and transmitting the audio signal of the inaudible frequency band to the external electronic device may be provided.

The non-transitory computer readable medium refers to a medium that stores data semi-permanently rather than storing data for a very short time, such as a register, a cache, and a memory, and a medium readable by a device. In detail, the aforementioned various applications or programs may be stored in the non-transitory computer readable medium, such as, for example, a compact disc (CD), a digital versatile disc (DVD), a hard disc, a Blu-ray disc, a universal serial bus (USB), a memory card, a read only memory (ROM), and the like, and may be provided.

While the disclosure has been illustrated and described with reference to various example embodiments thereof, the disclosure is not limited to the specific embodiments described. It will be understood by those skilled in the art that various changes in form and details may be made therein without departing from the spirit and scope of the disclosure.

What is claimed is:

1. An electronic device, comprising:
a microphone;
a communicator comprising circuitry performing communication with an external electronic device; and
a processor configured to:
based on receiving, via the microphone, an audio signal generated in surroundings of the microphone and an audio signal of an inaudible frequency band which the external electronic device outputs through a speaker connected to the external electronic device, remove audio signals of remaining frequency bands except for the inaudible frequency band from the received audio signals,
control the communicator to transmit an audio signal of the inaudible frequency band to the external electronic device to cause the external electronic device to identify whether an audio signal of the inaudible frequency band transmitted, by the external electronic device, to the speaker and the audio signal of the inaudible frequency band transmitted, by the electronic device, to the external electronic match a predetermined threshold value or more, and
based on receiving a signal requesting to stop transmitting the audio signal of the inaudible frequency band, control the communicator to stop transmitting the audio signal of the inaudible frequency band.

2. The electronic device of claim 1, wherein the processor is configured to, through a band pass filter, remove the audio signals of remaining frequency bands except for the inaudible frequency band from the received audio signals, and encode the audio signal of the inaudible frequency band to transmit to the external electronic device.

3. The electronic device of claim 1, wherein a data size of the audio signal of the inaudible frequency band is smaller than a size corresponding to a channel bandwidth between the electronic device and the external electronic device.

4. The electronic device of claim 1, wherein the audio signal generated in the surroundings of the microphone comprises at least one of an audio signal of an audible frequency band which the external electronic device outputs through the speaker and an audio signal uttered by a user in the surroundings of the microphone.

5. The electronic device of claim 1, wherein the processor is configured to activate the microphone to receive the audio signal based on receiving an audio transmission request signal from the external electronic device, and inactivate the microphone based on receiving a stop transmission request signal from the external electronic device after a signal of the inaudible frequency band is transmitted to the external electronic device.

6. An electronic device, comprising:
a communicator comprising circuitry configured to perform communication with a speaker and an external electronic device; and
a processor configured to:
control the communicator to transmit, to the speaker, a first audio signal of an inaudible frequency band,
control the communicator to transmit, to the external electronic device, a signal requesting a transmission of a second audio signal of an inaudible frequency band output by the speaker,
receive the second audio signal from the external electronic device via the communicator,
based on identifying that the first audio signal transmitted to the speaker and the second audio signal received from the external electronic device match a predetermined threshold value or more, control the communicator to transmit, to the external electronic device, a signal requesting to stop transmitting the second audio signal.

7. The electronic device of claim 6, wherein the second audio signal of the inaudible frequency band, through a band pass filter, is an audio signal with audio signals of remaining frequency bands removed except for the inaudible frequency band from signals comprising an audio signal generated in surroundings of the external electronic device and an audio signal of the inaudible frequency band output through the speaker.

8. The electronic device of claim 6, wherein a data size of the second audio signal of the inaudible frequency band is smaller than a size corresponding to a channel bandwidth between the electronic device and the external electronic device.

9. The electronic device of claim 6, wherein the audio signal generated in surroundings of the external electronic device comprises at least one of an audio signal of an audible frequency band which the electronic device outputs through the speaker and an audio signal uttered by a user in the surroundings of the external electronic device.

10. An audio system, comprising:
an electronic device configured to transmit, to a speaker, a first audio signal of an inaudible frequency band, and
an external electronic device configured to, based on receiving, via a microphone, an audio signal generated in surroundings of the microphone and an audio signal of the inaudible frequency band output through the speaker, remove audio signals of remaining frequency bands except for the inaudible frequency band from the received audio signals and transmit an audio signal of the inaudible frequency band to the electronic device,
wherein the electronic device is configured to:
transmit, to the external electronic device, a signal requesting a transmission of a second audio signal of the inaudible frequency band output by the speaker, receive the second audio signal from the external electronic device, based on identifying that the first audio signal transmitted to the speaker and the second audio signal received from the external electronic device match a predetermined threshold value or more, transmit, to the external electronic device, a signal requesting to stop transmitting the second audio signal.

11. The audio system of claim 10, wherein the external electronic device is configured to, through a band pass filter, remove the audio signals of remaining frequency bands except for the inaudible frequency band from the received audio signals, and encode the audio signal of the inaudible frequency band to transmit to the electronic device.

12. The audio system of claim 10, wherein a data size of the second audio signal of the inaudible frequency band is smaller than a size corresponding to a channel bandwidth between the electronic device and the external electronic device.

13. The audio system of claim 10, wherein the audio signal generated in the surroundings of the microphone comprises at least one of an audio signal of an audible frequency band which the electronic device outputs through the speaker and an audio signal uttered by a user in the surroundings of the microphone.

* * * * *